United States Patent
Hirose et al.

(10) Patent No.: US 11,283,060 B2
(45) Date of Patent: Mar. 22, 2022

(54) NEGATIVE ELECTRODE ACTIVE MATERIAL, MIXED NEGATIVE ELECTRODE ACTIVE MATERIAL, AND METHOD FOR PRODUCING NEGATIVE ELECTRODE ACTIVE MATERIAL PARTICLE

(71) Applicant: SHIN-ETSU CHEMICAL CO., LTD., Tokyo (JP)

(72) Inventors: Takakazu Hirose, Annaka (JP); Takumi Matsuno, Annaka (JP); Reiko Sakai, Takasaki (JP); Kohta Takahashi, Takasaki (JP); Hidekazu Awano, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/495,623

(22) PCT Filed: May 18, 2018

(86) PCT No.: PCT/JP2018/019271
§ 371 (c)(1),
(2) Date: Sep. 19, 2019

(87) PCT Pub. No.: WO2018/221268
PCT Pub. Date: Dec. 6, 2018

(65) Prior Publication Data
US 2020/0028152 A1    Jan. 23, 2020

(30) Foreign Application Priority Data
Jun. 1, 2017 (JP) .............................. JP2017-109468

(51) Int. Cl.
*H01M 4/02* (2006.01)
*H01M 4/36* (2006.01)
(Continued)

(52) U.S. Cl.
CPC ......... *H01M 4/131* (2013.01); *H01M 4/1391* (2013.01); *H01M 4/485* (2013.01); *H01M 10/0525* (2013.01); *H01M 2004/027* (2013.01)

(58) Field of Classification Search
CPC .... H01M 4/131; H01M 4/1391; H01M 4/485; H01M 10/0525; H01M 2004/027; H01M 4/366; H01M 4/625; Y02E 60/10
(Continued)

(56) References Cited

U.S. PATENT DOCUMENTS 5,395,711 A    3/1995  Tahara et al.
9,647,263 B2 *  5/2017  Green ..................... C01B 33/02
(Continued)

FOREIGN PATENT DOCUMENTS

JP          2997741 B2      1/2000
JP       2001-185127 A      7/2001
(Continued)

OTHER PUBLICATIONS

Jun. 16, 2020 Office Action issued in Japanese Patent Application No. 2017-109468.
(Continued)

*Primary Examiner* — Christian Roldan
(74) *Attorney, Agent, or Firm* — Oliff PLC (57) ABSTRACT

A negative electrode active material contains a negative electrode active material particle which includes a silicon compound particle containing a silicon compound that contains oxygen. The silicon compound particle contains a Li compound, and at least part of Si constituting the silicon compound particle is present in at least one state selected from oxide of $Si^{2+}$ to $Si^{3+}$ containing no Li, and compound containing Li and $Si^{2+}$ to $Si^{3+}$. A negative electrode active material is capable of increasing battery capacity and improving cycle characteristics and initial charge-discharge (Continued)

characteristics when the negative electrode active material is used for a secondary battery. A mixed negative electrode active material contains the negative electrode active material. A method produces a negative electrode active material particle which enables production of the negative electrode active material particle to be contained in the negative electrode active material as described above.

6 Claims, 4 Drawing Sheets

(51) Int. Cl.
    *H01M 4/62*     (2006.01)
    *H01M 4/48*     (2010.01)
    *H01M 4/38*     (2006.01)
    *H01M 4/131*     (2010.01)
    *H01M 4/1391*     (2010.01)
    *H01M 4/485*     (2010.01)
    *H01M 10/0525*     (2010.01)

(58) Field of Classification Search
    USPC .......................................................... 429/322
    See application file for complete search history.

(56) References Cited

U.S. PATENT DOCUMENTS

| | | | |
|---|---|---|---|
| 2004/0033419 A1* | 2/2004 | Funabiki | H01M 4/625 |
| | | | 429/218.1 |
| 2006/0083987 A1 | 4/2006 | Konishiike et al. | |
| 2006/0099507 A1 | 5/2006 | Kogetsu et al. | |
| 2008/0176137 A1 | 7/2008 | Endo et al. | |
| 2009/0075173 A1 | 3/2009 | Jeong et al. | |
| 2009/0202911 A1 | 8/2009 | Fukuoka et al. | |
| 2011/0159368 A1 | 6/2011 | Hirose et al. | |
| 2015/0372292 A1 | 12/2015 | Yokoi et al. | |
| 2016/0233490 A1 | 8/2016 | Put et al. | |
| 2017/0117543 A1* | 4/2017 | Park | H01M 4/1391 |
| 2018/0175377 A1 | 6/2018 | Hirose et al. | |
| 2018/0309160 A1 | 10/2018 | Kizaki et al. | |
| 2019/0097223 A1 | 3/2019 | Hirose et al. | |
| 2019/0123353 A1 | 4/2019 | Hirose et al. | |

FOREIGN PATENT DOCUMENTS

| | | | |
|---|---|---|---|
| JP | 2002-042806 A | | 2/2002 |
| JP | 2006-114454 A | | 4/2006 |
| JP | 2006-164954 A | | 6/2006 |
| JP | 2006-244813 A | | 9/2006 |
| JP | 2007-234255 A | | 9/2007 |
| JP | 2008-177346 A | | 7/2008 |
| JP | 2008-251369 A | | 10/2008 |
| JP | 2008-282819 A | | 11/2008 |
| JP | 2009-070825 A | | 4/2009 |
| JP | 2009-205950 A | | 9/2009 |
| JP | 2009-212074 A | | 9/2009 |
| JP | 2012-256539 A | | 12/2012 |
| JP | 2015-056260 A | | 3/2015 |
| JP | 201435940 | * | 12/2015 |
| JP | 2016-042487 A | | 3/2016 |
| JP | 2016-530189 A | | 9/2016 |
| JP | 2017-027959 A | | 2/2017 |
| JP | 2018-006190 A | | 1/2018 |
| WO | 2015/015795 A1 | | 2/2015 |
| WO | 2016/098306 A1 | | 6/2016 |
| WO | 2016/203696 A1 | | 12/2016 |
| WO | 2017/085911 A1 | | 5/2017 |

OTHER PUBLICATIONS

Aug. 14, 2018 Search Report issued in International Patent Application No. PCT/JP2018/019271.
Dec. 3, 2019 International Preliminary Report on Patentability issued in International Patent Application No. PCT/JP2018/019271.
Jan. 26, 2021 Office Action issued in Japanese Patent Application No. 2017-109468.
Jan. 28, 2021 Extended European Search Report issued in European Patent Application No. 18810624.9.

* cited by examiner

NEGATIVE ELECTRODE ACTIVE MATERIAL, MIXED NEGATIVE ELECTRODE ACTIVE MATERIAL, AND METHOD FOR PRODUCING NEGATIVE ELECTRODE ACTIVE MATERIAL PARTICLE

TECHNICAL FIELD

The present invention relates to a negative electrode active material, a mixed negative electrode active material, and a method for producing a negative electrode active material particle.

BACKGROUND ART

In recent years, small electronic devices, represented by mobile terminals, have been widely used and urgently required to reduce the size and weight and to increase the life. Such market requirements have advanced the development of particularly small and lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than that of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon-based active material, is required to further improve the battery capacity for recent market requirement. Use of silicon as a negative electrode active material is considered to improve the battery capacity, for silicon has a theoretical capacity (4199 mAh/g) ten times or more larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon-based active materials ranges from a standard application type to an integrated type in which the materials are directly accumulated on a current collector.

Use of silicon as a main material of a negative electrode active material, however, expands or shrinks the negative electrode active material when charging or discharging, thereby making the negative electrode active material easy to break particularly near its surface layer. In addition, this negative electrode active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle characteristics easy to reduce.

Various materials and configurations of a negative electrode for a lithium-ion secondary battery mainly using a silicon material have been considered to improve the initial efficiency and the cycle characteristics of the battery.

Specifically, a vapor deposition method is used to accumulate silicon and amorphous silicon dioxide simultaneously so that better cycle characteristics and greater safety are achieved (see Patent Document 1, for example). Moreover, a carbon material (an electronic conduction material) is disposed on the surface of silicon oxide particles so that a higher battery capacity and greater safety are achieved (see Patent Document 2, for example). Moreover, an active material including silicon and oxygen is produced to form an active material layer having a higher ratio of oxygen near a current collector so that improved cycle characteristics and higher input-output characteristics are achieved (see Patent Document 3, for example). Moreover, silicon active material is formed so as to contain oxygen with an average content of 40 at % or less and with a higher oxygen content near a current collector so that improved cycle characteristics are achieved (see Patent Document 4, for example).

Moreover, a nano-complex including Si-phase, $SiO_2$, and $M_yO$ metal oxide is used to improve the first time charge-discharge efficiency (see Patent Document 5, for example). To improve the cycle characteristics, $SiO_x$ ($0.8 \leq x \leq 1.5$, the range of particle size=1 μm to 50 μm) and a carbon material are mixed and calcined at a high temperature (see Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle characteristics are achieved (see Patent Document 7, for example). Moreover, a metal oxide containing lithium is used to improve the battery load characteristics (see Patent Document 8, for example). To improve the cycle characteristics, a hydrophobic layer such as a silane compound layer is formed on the surface of a silicon material (see Patent Document 9, for example). Moreover, a silicon oxide is used and coated with graphite coating to give electric conductivity so that improved cycle characteristics are achieved (see Patent Document 10, for example). In Patent Document 10, the graphite coating exhibits a Raman spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, a particle having a silicon microcrystal phase dispersed in a silicon dioxide is used to achieve a higher battery capacity and improved cycle characteristics (see Patent Document 11, for example). Moreover, a silicon oxide controlled to have a silicon-to-oxygen atomicity ratio of 1:y ($0 < y < 2$) is used to improve overcharge and overdischarge characteristics (see Patent Document 12, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2008-282819

Patent Document 7: Japanese Unexamined Patent publication (Kokai) No. 2008-251369

Patent Document 8: Japanese Unexamined Patent publication (Kokai) No. 2008-177346

Patent Document 9: Japanese Unexamined Patent publication (Kokai) No. 2007-234255

Patent Document 10: Japanese Unexamined Patent publication (Kokai) No. 2009-212074

Patent Document 11: Japanese Unexamined Patent publication (Kokai) No. 2009-205950

Patent Document 12: Japanese Patent No. 2997741

SUMMARY OF INVENTION

Technical Problem

As described above, small electronic devices, represented by mobile devices, have been advancing recently toward high performance and multifunction, and a lithium ion secondary battery that is main electric source thereof is required to improve a battery capacity. As a technique to solve this problem, it is desired to develop a lithium ion secondary battery containing a negative electrode using a silicon material as a main material. In addition, the lithium ion secondary battery using a silicon material is desired to have initial charge-discharge characteristics and cycle characteristics almost equivalent to those of a lithium ion secondary battery using a carbon-based active material. The battery cycle characteristics can be dramatically improved by using a silicon oxide material. Further, as a method for improving the battery initial efficiency, a method of doping a silicon oxide material with Li can be adopted. In these ways, it has been possible to greatly improve the characteristics of a negative electrode active material using a silicon material. However, silicon materials are inferior to carbon materials in cycle characteristics, and no silicon materials having cycle characteristics equivalent to those of carbon materials have been proposed yet.

The present invention has been accomplished in view of problems as described above. An object of the present invention is to provide a negative electrode active material that is capable of increasing battery capacity and improving cycle characteristics and initial charge-discharge characteristics when the negative electrode active material is used for a secondary battery; and a mixed negative electrode active material containing this negative electrode active material. Another object is to provide a method for producing a negative electrode active material particle which enables production of the negative electrode active material particle to be contained in the negative electrode active material as described above.

Solution To Problem

To achieve the object, the present invention provides a negative electrode active material containing a negative electrode active material particle;

the negative electrode active material particle comprising a silicon compound particle containing a silicon compound that contains oxygen, wherein the silicon compound particle contains a Li compound, and at least part of Si constituting the silicon compound particle is present in at least one state selected from oxide of $Si^{2+}$ to $Si^{3+}$ containing no Li, and compound containing Li and $Si^{2-}$ to $Si^{3+}$.

Since the inventive negative electrode active material (hereinafter, also referred to as silicon-based negative electrode active material) contains a negative electrode active material particle including a silicon compound particle (hereinafter, also referred to as silicon-based negative electrode active material particle), the battery capacity can be improved. Moreover, incorporating a Li compound in the silicon compound particle makes it possible to reduce irreversible capacity generated in charging. Further, the inventive negative electrode active material is capable of improving the battery cycle characteristics because at least part of Si constituting the negative electrode active material particle is present in at least one state selected from oxide of $Si^{2+}$ to $Si^{3+}$ containing no Li, and compound containing Li and $Si^{2+}$ to $Si^{3|}$.

In this case, the silicon compound particle preferably has a peak or shoulder peak in an energy range from 1844 eV to 1846.5 eV in a XANES region of a Si K-edge in an X-ray absorption spectrum obtained when an X-ray absorption fine structure analysis (XAFS) is performed.

In such silicon compound particle, the Si element is present as $Si^{2+}$ to $Si^{3+}$. Consequently, the battery cycle characteristics can be improved.

Moreover, in this case, as the silicon compound particle is charged with electricity in a larger amount in an electricity charging process, the peak or shoulder peak appearing in the energy range from 1844 eV to 1846.5 eV in the XANES region of the Si K-edge preferably has a higher intensity.

The silicon compound particle having such a peak can further improve the battery cycle characteristics of the battery which uses the inventive negative electrode active material.

Moreover, the silicon compound particle preferably has a peak at a position where an energy is from 534 eV or more and less than 535 eV in a XANES region of an 0 K-edge in an X-ray absorption spectrum obtained when an X-ray absorption fine structure analysis is performed.

In the XANES region of the O K-edge, a peak appearing at an energy position of 534 eV is assigned to Li—O bond, while a peak appearing at 535 eV is assigned to Si—O bond. Having a peak near the position of 534 eV means that part of Si—O bond has changed to stable Li—O bond. Such silicon compound particle can stabilize the change in the bulk phase structure caused by charging and discharging.

Further, the silicon compound particle preferably contains at least one or more of $Li_2SiO_3$ and $Li_2Si_2O_5$ as the Li compound.

When the silicon compound particle contains the Li silicate(s) which are relatively stable as the Li compound, the initial charge-discharge characteristics and cycle characteristics of the negative electrode active material can be improved, and the stability in a slurry is further improved in preparing an electrode.

Further, the silicon compound preferably contains silicon and oxygen as $SiO_x$ in a ratio within $0.5 \leq x \leq 1.6$.

The negative electrode active material containing such a silicon compound, that is, silicon oxide shown by $SiO_x$ ($0.5 \leq x \leq 1.6$), is a negative electrode active material having more favorable cycle characteristics.

Preferably, the silicon compound particle has a diffraction peak attributable to a Si(111) crystal face obtained from an X-ray diffraction using a Cu-Kα line, a half value width (2θ) of the diffraction peak is 1.2° or more, and a crystallite size corresponding to the Si(111) crystal face is 7.5 nm or less.

When the negative electrode active material with the silicon compound particle having the above silicon crystallinity is used as a negative electrode active material for a lithium ion secondary battery, more favorable cycle characteristics and initial charge-discharge characteristics are obtained.

Further, the negative electrode active material particle preferably has a median diameter of 1.0 μm or more and 15 μm or less.

When the median diameter is 1.0 μm or more, the surface area per mass is sufficiently large, so that an increase in irreversible battery capacity can be suppressed. Meanwhile, when the median diameter is 15 μm or less, the particle is hard to break and thereby prevented from forming a new surface.

Moreover, the negative electrode active material particle preferably has a surface layer portion containing a carbon material.

When the surface layer portion of the negative electrode active material particle contains a carbon material as described above, the electric conductivity is improved. When the negative electrode active material containing such a negative electrode active material particle is used as a negative electrode active material for a secondary battery, the battery characteristics can be improved.

In addition, the carbon material preferably has an average thickness of 5 nm or more and 5000 nm or less.

When the average thickness of the carbon material is 5 nm or more, the electric conductivity is improved. Moreover, when the average thickness of the carbon material for covering is 5000 nm or less, the use of the negative electrode active material containing such negative electrode active material particles for a lithium ion secondary battery makes it possible to secure a sufficient amount of the silicon compound particles therein, thereby preventing lowering of the battery capacity.

Furthermore, to achieve the above-described object, the present invention provides a mixed negative electrode active material comprising:

the inventive negative electrode active material; and a carbon-based active material.

When the material for forming a negative electrode active material layer contains a carbon-based active material together with the inventive silicon-based negative electrode active material as described above, it is possible to improve the electric conductivity of the negative electrode active material layer and to ease the expanding stress due to charging. In addition, the battery capacity can be increased by mixing the silicon-based negative electrode active material with a carbon-based active material.

Furthermore, to achieve the above-described object, the present invention provides a method for producing a negative electrode active material particle including a silicon compound particle, comprising the steps of:

preparing a silicon compound particle containing a silicon compound that contains oxygen; inserting Li into the silicon compound particle; and heating, while stirring, the Li-inserted silicon compound particle in a furnace to produce a negative electrode active material particle, wherein at least part of Si constituting the silicon compound particle is present in at least one state selected from oxide of $Si^{2+}$ to $Si^3$ containing no Li, and compound containing Li and $Si^{2+}$ to $Si^{3+}$.

Such a production method enables the production of a negative electrode active material particle capable of increasing battery capacity and improving cycle characteristics and initial charge-discharge characteristics when the negative electrode active material particle is used as a negative electrode active material for a secondary battery.

Advantageous Effects of Invention

The inventive negative electrode active material brings high capacity and favorable cycle characteristics and initial charge-discharge characteristics when used as a negative electrode active material for a secondary battery. Moreover, the mixed negative electrode active material containing this negative electrode active material also brings the same effects.

In addition, the inventive method for producing a negative electrode active material particle makes it possible to produce a negative electrode active material particle having high capacity and favorable cycle characteristics and initial charge-discharge characteristics when the negative electrode active material particle is used as a negative electrode active material for a secondary battery.

DESCRIPTION OF EMBODIMENTS

Hereinafter, embodiments of the present invention will be described, but the present invention is not limited thereto.

As described above, for increasing battery capacity of lithium ion secondary batteries, it has been investigated a method using a negative electrode mainly made from a silicon material as a negative electrode for a lithium ion secondary battery. Such a lithium ion secondary battery using the silicon material is desired to have initial charge-discharge characteristics and cycle characteristics almost equivalent to those of a lithium ion secondary battery using a carbon-based active material. However, heretofore, there has not been proposed a negative electrode active material that exhibits initial charge-discharge characteristics and cycle characteristics equivalent to those of a carbon-based active material when the negative electrode active material is used for a lithium ion secondary battery.

Accordingly, the present inventors have diligently investigated to obtain a negative electrode active material capable of increasing battery capacity and improving cycle characteristics and initial charge-discharge characteristics when the negative electrode active material is used for a secondary battery; thereby, providing the present invention. Consequently, the inventors have found that high battery capacity and favorable cycle characteristics are obtained by using a negative electrode active material containing a negative electrode active material particle, the negative electrode active material particle comprising a silicon compound particle containing a silicon compound that contains oxygen, wherein the silicon compound particle contains a Li compound, and at least part of Si constituting the silicon compound particle is present in at least one state selected from oxide of $Si^{2+}$ to $Si^{3+}$ containing no Li, and compound containing Li and $Si^{2+}$ to $Si^{3+}$. This finding has led to the completion of the present invention.

<Negative Electrode>

Figure 1:
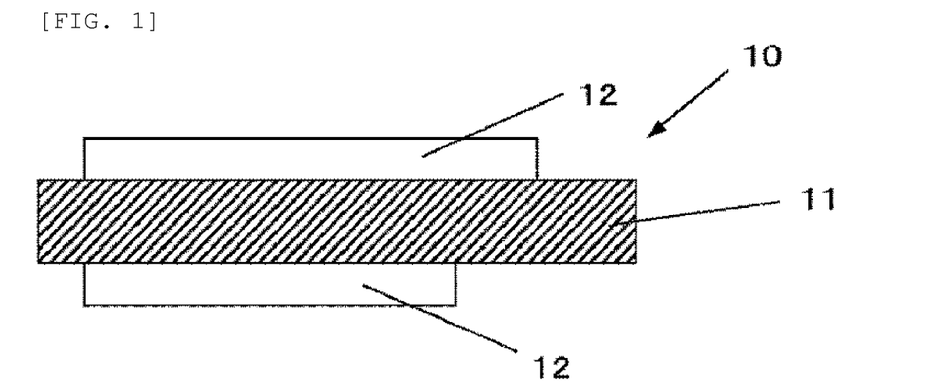
FIG. 1 is a sectional view showing an example of configuration of a negative electrode for a non-aqueous electrolyte secondary battery that contains the inventive negative electrode active material.

First, a negative electrode (negative electrode for a non-aqueous electrolyte secondary battery) will be described. FIG. 1 is a sectional view showing an example of configuration of the inventive negative electrode.

[Configuration of Negative Electrode]

As shown in FIG. 1, a negative electrode 10 is constituted to have a negative electrode active material layer 12 on a negative electrode current collector 11. The negative electrode active material layer 12 may be disposed on both sides or only one side of the negative electrode current collector 11. Further, as long as the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material usable for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector 11. In particular, when the negative electrode has an active material layer that expands in charging, the current collector containing the above elements has an effect of suppressing deformation of an electrode including the current collector. Each content of the contained elements is not particularly limited, but is preferably 100 ppm by mass or less. This is because a high effect of suppressing deformation is obtained. Such an effect of suppressing deformation can further improve the cycle characteristics.

The surface of the negative electrode current collector 11 may or may not be roughened. Examples of the roughened negative electrode current collector include a metallic foil subjected to an electrolyzing process, an embossing process, or a chemical etching process, and the like. Examples of the negative electrode current collector that is not roughened include a rolled metallic foil and the like.

[Negative Electrode Active Material Layer]

The negative electrode active material layer 12 in FIG. 1 contains the inventive negative electrode active material which is capable of occluding and releasing lithium ions. In view of battery design, other materials may be further contained, such as a negative electrode binding agent (binder) or a conductive assistant agent. The inventive negative electrode active material contains a negative electrode active material particle, and this negative electrode active material particle includes a silicon compound particle containing a silicon compound that contains oxygen.

This silicon compound preferably contains silicon and oxygen as $SiO_x$ in a ratio within $0.5 \le x \le 1.6$. When "x" is 0.5 or more, the oxygen ratio is higher than that of silicon single substance, making the cycle characteristics favorable. When "x" is 1.6 or less, the resistance of the silicon oxide is not too high and is preferable. Particularly, in the composition of $SiO_x$, "x" is preferably close to 1 because higher cycle characteristics are obtained. Note that the composition of the silicon compound in the present invention does not necessarily mean purity of 100%, and may contain a small quantity of impurity elements. Since the inventive negative electrode active material contains a negative electrode active material particle including a silicon compound particle as described above, the battery capacity can be improved.

Additionally, in the inventive negative electrode active material, the silicon compound particle contains a Li compound. More specifically, the silicon compound particle preferably contains at least one or more of $Li_2SiO_3$ and $Li_2Si_2O_5$. These are $SiO_2$ components in a silicon compound which become unstable upon insertion and release of lithium when a battery is charged and discharged. These components are modified to other lithium silicates in advance. Thus, the irreversible capacity generated in charging can be reduced. Moreover, since these Li silicates are relatively stable as the Li compounds, incorporating these further improves the stability in a slurry in preparing an electrode.

In addition, when at least one or more of $Li_2SiO_3$ and $Li_2Si_2O_5$ is present in the bulk of the silicon compound particle, the battery characteristics are improved. Nevertheless, when two or more Li compounds are co-present, the battery characteristics are further improved. In such Li compounds, the valence of the Si element is +4 ($Si^{4+}$). Note that these lithium silicates can be quantified NMR (Nuclear Magnetic Resonance) or XPS (X-ray photoelectron spectroscopy). The XPS and NMR measurements can be performed under the following conditions, for example.

XPS

Apparatus: an X-ray photoelectron spectrometer,
X-ray Source: a monochromatic Al Kα line,
X-ray Spot Diameter: 100 μm,
Ar-ion Gun Sputtering Conditions: 0.5 kV/2 mm×2 mm.

$^{29}$Si-MAS-NMR (Magic Angle Spinning-Nuclear Magnetic Resonance)

Apparatus: a 700-NMR spectroscope made by Bruker Corp.,
Probe: a 4-mm HR-MAS rotor, 50 μL,
Sample Spinning Speed: 10 kHz,
Measurement Environment Temperature: 25° C.

Further, in the inventive negative electrode active material, at least part of Si constituting the silicon compound particle is present in at least one state selected from oxide of $Si^{2+}$ to $Si^{3-}$ containing no Li, and compound containing Li and $Si^{2+}$ to $Si^{3+}$. This means that the silicon compound particle contains one or both of $Si^{2+}$ and $Si^{3+}$ in at least one state selected from oxide state containing no Li and compound state containing Li. Additionally, it is difficult to show the compound containing Li and $Si^{2+}$ to $Si^{3+}$ by the molecular formula or compositional formula because the compound containing Li and $Si^{2-}$ to $Si^{3+}$ is the oxide of $Si^{2+}$ to $Si^{3+}$ in which Li is occluded.

When an ordinary silicon oxide material is charged, there occurs silicide reaction, in which Si and Li react, as well as Li silicate reaction, in which $SiO_2$ and Li react, so that Si singly has a capacity. That is, Si singly functions as an active material to occlude and release Li. By the way, Li silicates, such as $Li_4SiO_4$ formed by Li silicate reaction, in which $SiO_2$ having quadrivalent Si reacts with Li during charging, have quadrivalent Si, but such Li compounds are so stable that Li is hardly released. Accordingly, such Li silicate does not function as an active material and may cause irreversible capacity. On the other hand, Si atoms present in the state of $Si^{2+}$ to $Si^{3+}$ function as active materials, and the charge-discharge cycles are continued while the Si atoms with such intermediate valences have Si—O bonds. Thus, the inventive negative electrode active material is capable of improving cycle characteristics because of the presence of Si in $Si^{2+}$ to $Si^{3+}$ states. Particularly, among Si atoms with intermediate valences (not $Si^0$ or $Si^{4+}$, but $Si^+$, $Si^{2+}$, $Si^{3+}$), the larger the valence, the further the cycle characteristics are improved. That is, specifically, the cycle characteristics are further improved in the presence of Si with a valence of 2, 3 as in the present invention than Si with a valence of 1.

Moreover, in the present invention, the silicon compound particle preferably has a peak or shoulder peak in an energy range from 1844 eV to 1846.5 eV in a XANES region of a Si K-edge in an X-ray absorption spectrum obtained when an X-ray absorption fine structure analysis is performed. Peaks or shoulder peaks appearing in this range are assigned to $Si^{2+}$ and $Si^{3+}$. Accordingly, if a peak or shoulder peak appears like these, the battery cycle characteristics can be dramatically improved because of the stable phase structure. Incidentally, whether a peak or shoulder peak appeared within the above range was checked by waveform separation simulation.

Moreover, in the present invention, as the silicon compound particle is charged with electricity in a larger amount in an electricity charging process, the peak or shoulder peak appearing in the energy range from 1844 eV to 1846.5 eV in the above-described XANES region of the Si K-edge preferably has a higher intensity. In this case, the Si element having the aforementioned valences conceivably contributes to charging and forms the stable phase structure, making it possible to improve the cycle characteristics.

Further, in the present invention, the silicon compound particle preferably has a peak at a position where an energy is from 534 eV or more and less than 535 eV in a XANES region of an O K-edge in an X-ray absorption spectrum obtained when an X-ray absorption fine structure analysis is performed. A peak appearing at an energy position of 534 eV is assigned to Li—O bond, while a peak appearing at 535 eV is assigned to Si—O bond. Having a peak near the position of 534 eV means part of Si—O bond has changed to stable Li—O bond. Such silicon compound particle is capable of stabilizing the change in the bulk phase structure caused by charging and discharging. Incidentally, whether a peak or shoulder peak appeared within the above range was checked by waveform separation simulation.

Preferably, the silicon compound particle has a diffraction peak attributable to a Si(111) crystal face obtained from an X-ray diffraction using a Cu-Kα line, a half value width (2θ) of the diffraction peak is 1.2° or more, and a crystallite size corresponding to the Si(111) crystal face is 7.5 nm or less. Particularly preferably, the crystallite is small and substantially amorphous. This peak appears around 2θ=28.4±0.5° when the crystallinity is high (when the half value width is narrow). In the silicon compound particle, the lower the silicon crystallinity of the silicon compound, the better. Particularly, when the content of the Si crystal is lower, the battery characteristics can be improved, and further stable Li compound can be formed.

Moreover, in the inventive negative electrode active material, the negative electrode active material particle preferably has a surface layer portion containing a carbon material. The negative electrode active material particle improves the electric conductivity by containing a carbon material in the surface layer portion. Accordingly, when the negative electrode active material containing the negative electrode active material particle like this is used as a negative electrode active material for a secondary battery, the battery characteristics are successfully improved.

In this case, the carbon material of the surface layer portion of the negative electrode active material particle preferably has an average thickness of 5 nm or more and 5000 nm or less. When the average thickness of the carbon material is 5 nm or more, the electric conductivity is improved. Meanwhile, when the average thickness of the carbon material for covering is 5000 nm or less, it is possible to prevent lowering of the battery capacity in case of using a negative electrode active material containing a negative electrode active material particle like this as a negative electrode active material for a lithium ion secondary battery.

The average thickness of this carbon material can be calculated by the following procedure, for example. First, the negative electrode active material particles are observed through TEM (transmission electron microscope) at an optional magnification. This magnification is preferably a magnification by which the thickness of the carbon material can be determined visually so as to measure the thickness. Subsequently, the thicknesses of the carbon material are measured at 15 random points. In this case, it is preferable to set the measuring points as widely and randomly as possible without focusing a particular place. Lastly, the average value of the thicknesses of the carbon material at the 15 points is calculated.

The covering rate of the carbon material is not particularly limited, but is desirable to be as high as possible. The covering rate of 30% or more improves the electric conductivity further, and is preferable. The method for covering the carbon material is not particularly limited, but a method of carbonizing saccharide and a pyrolysis method of hydrocarbon gas are preferable since they can improve the covering rate.

The negative electrode active material particle preferably has a median diameter ($D_{50}$: the particle diameter when the accumulated volume becomes 50%) of 1.0 μm or more and 15 μm or less. When the median diameter is in the above range, lithium ions are easily occluded and released in charging and discharging, and the negative electrode active material particle becomes less liable to break. When the median diameter is 1.0 μm or more, it is possible to decrease the surface area per mass of the negative electrode active material particle to prevent increase of the irreversible battery capacity. On the other hand, when the median diameter is 15 μm or less, the particle becomes less liable to break, thereby being prevented from forming a new surface.

Further, the negative electrode active material layer 12 may contain a mixed negative electrode active material that contains the inventive negative electrode active material (silicon-based negative electrode active material) and a carbon-based active material. This makes it possible to decrease the electric resistance of the negative electrode active material layer and to ease the expanding stress due to charging. As the carbon-based active material, for example, pyrolytic carbons, cokes, glassy carbon fiber, calcined organic polymer compounds, carbon black, and the like are usable.

In the mixed negative electrode active material, the mass ratio of the silicon-based negative electrode active material is preferably 6 mass % or more relative to the sum of masses of the inventive silicon-based negative electrode active material and the carbon-based active material. When the mass ratio of the silicon-based negative electrode active material is 6 mass % or more relative to the sum of masses of the silicon-based negative electrode active material and the carbon-based active material, it is possible to surely improve the battery capacity.

Additionally, as the negative electrode binder contained in the negative electrode active material layer, any one or more of polymer material, synthetic rubber, and so on are usable, for example. Examples of the polymer material include polyvinylidene fluoride, polyimide, polyamideimide, aramid, polyacrylic acid, lithium polyacrylate, carboxymethyl cellulose, and the like. Examples of the synthetic rubber include styrene-butadiene rubber, fluororubber, ethylene-propylene-diene, and the like.

As the negative electrode conductive assistant agent, any one or more of a carbon material, such as carbon black, acetylene black, graphite, ketjen black, carbon nanotube, and carbon nanofiber are usable, for example.

The negative electrode active material layer is formed by an application method, for example. The application method is a method in which a silicon-based negative electrode active material is mixed with the above binder and so on, optionally with a conductive assistant agent or a carbon-based active material, and then dispersed to organic solvent, water, or the like so as to be applied.

[Method of Producing Negative Electrode]

The negative electrode 10 can be produced by the following procedures, for example. First, a method for producing a negative electrode active material particle to be contained in the negative electrode active material will be described. In the beginning, a silicon compound particle containing a silicon compound that contains oxygen is prepared. Next, lithium is inserted into the silicon compound particle. Then, the Li-inserted silicon compound particle is heated in a furnace while being stirred, so that at least part of Si constituting the silicon compound particle is present in at least one state selected from oxide of $Si^{2+}$ to $Si^{3+}$ containing no Li, and compound containing Li and $Si^{2+}$ to $Si^{3+}$. Thus, a negative electrode active material particle is prepared. In this event, $Si^{2+}$ to $Si^{3+}$ can be formed stably by stirring the silicon compound particle during the heat treatment. If stirring is not performed during the heat treatment, $Si^{2+}$ to $Si^{3+}$ cannot be formed stably.

Si compounds having specific valences can be formed in the negative electrode active material produced according to the production method as above. This enables the production of a negative electrode active material having high capacity and favorable cycle characteristics and initial charge-discharge characteristics when the negative electrode active material is used for a secondary battery.

Subsequently, a method for producing the inventive negative electrode active material will be described more specifically.

First of all, a silicon compound particle containing a silicon compound that contains oxygen is prepared. Hereinbelow, description will be given of a case where silicon oxide shown by $SiO_x$ ($0.5 \leq x \leq 1.6$) is used as the silicon compound that contains oxygen. First, a raw material which generates silicon oxide gas is heated in the presence of inert gas under reduced pressure in a temperature range of 900° C. to 1600° C. to generate silicon oxide gas. In this case, a mixture of metallic silicon powder and silicon dioxide powder can be used as the raw material. In consideration of the existence of oxygen on the surface of the metallic silicon powder and slight oxygen in a reaction furnace, the mixing mole ratio is desirably in a range of 0.8<metallic silicon powder/silicon dioxide powder<1.3.

The generated silicon oxide gas is solidified and deposited on an absorbing plate. Subsequently, the deposit of silicon oxide is taken out under the condition of the temperature in the reaction furnace of 100° C. or below, and then the deposit is ground and powdered using a ball mil, a jet mil, or the like. As described above, the silicon compound particle can be produced. Note that the Si crystallite in the silicon compound particle can be controlled by changing the evaporation temperature of the raw material which generates silicon oxide gas or a heat treatment after the preparation of the silicon compound particle.

Here, on the surface layer of the silicon compound particle, a carbon material layer may be formed. As a method to form the carbon material layer, a thermal decomposition CVD method is desirable. Hereinafter, an example of the method for forming a carbon material layer by thermal decomposition CVD method will be described.

First, the silicon compound particle is set in a furnace. Then, a hydrocarbon gas is introduced into the furnace, and the temperature in the furnace is raised. The pyrolysis temperature is preferably, but not particularly limited to, 1200° C. or less, more preferably 950° C. or less. When the pyrolysis temperature is 1200° C. or less, it is possible to prevent unintentional disproportionation of the active material particle. After raising the furnace temperature to a prescribed temperature, a carbon layer is formed onto the surface of the silicon compound particle. The hydrocarbon gas to be the raw material of the carbon material is not particularly limited, but preferably has a composition of $C_nH_m$ where $n \leq 3$. When $n \leq 3$, it is possible to decrease the production cost and to improve the properties of the decomposition products.

Next, Li is inserted into the silicon compound particle prepared as described above. Thereby, a negative electrode active material particle including the silicon compound particle having the lithium inserted therein is prepared. That is, the silicon compound particle is modified, and the Li compound such as $Li_2SiO_3$ and $Li_2Si_2O_5$ is formed inside the silicon compound particle. The Li-inserted silicon compound particle is heated with stirring in a furnace (also referred to as heat stirring method) so that at least part of Si constituting the silicon compound particle can exist in at least one state selected from oxide of $Si^{2+}$ to $Si^{3+}$ containing no Li, and compound containing Li and $Si^{2+}$ to $Si^{3+}$.

More specifically, the silicon compound particle may be immersed in a solution containing Li for the Li doping. For example, first, lithium is dissolved in an ether solvent to prepare a solution A. The silicon compound particle is immersed in the solution A, so that lithium can be inserted. The solution A may further contain a polycyclic aromatic compound or a linear polyphenylene compound. After the lithium insertion, the silicon compound particle may be immersed in a solution B containing a polycyclic aromatic compound or a derivative thereof to release active lithium from the silicon compound particle. As a solvent of the solution B, for example, an ether-based solvent, a ketone-based solvent, an ester-based solvent, an alcohol-based solvent, an amine-based solvent, or a mixed solvent thereof can be used. Alternatively, after immersed in the solution A, the resulting silicon compound particle may be heated with stirring in inert gas. The heat treatment with stirring can stabilize the Li compound. Then, washing may be performed, for example, by a washing method with alcohol, alkaline water in which lithium carbonate is dissolved, weak acid, pure water, or the like.

As the ether-based solvent used in the solution A, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, or the like. Among these, tetrahydrofuran, dioxane, and 1,2-dimethoxy ethane are particularly preferably used. These solvents are preferably dehydrated, and preferably deoxygenized.

Moreover, as the polycyclic aromatic compound contained in the solution A, it is possible to use one or more kinds of naphthalene, anthracene, phenanthrene, naphthacene, pentacene, pyrene, picene, triphenylene, coronene, chrysene, and derivatives thereof. As the linear polyphenylene compound, it is possible to use one or more kinds of biphenyl, terphenyl, and derivatives thereof.

As the polycyclic aromatic compound contained in the solution B, it is possible to use one or more kinds of naphthalene, anthracene, phenanthrene, naphthacene, pentacene, pyrene, picene, triphenylene, coronene, chrysene, and derivatives thereof.

Moreover, as the ether-based solvent of the solution B, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, and the like.

As the ketone-based solvent, acetone, acetophenone, and the like may be used.

As the ester-based solvent, methyl formate, methyl acetate, ethyl acetate, propyl acetate, isopropyl acetate, and the like may be used.

As the alcohol-based solvent, methanol, ethanol, propanol, isopropyl alcohol, and the like may be used.

As the amine-based solvent, methyl amine, ethyl amine, ethylene diamine, and the like may be used.

Alternatively, the modification may be performed by an electrochemical doping method. In this case, the materials formed in the bulk can be controlled by adjusting insertion potential or release potential, or changing current density, bath temperature, or the number of insertion or release operations.

Figure 2:
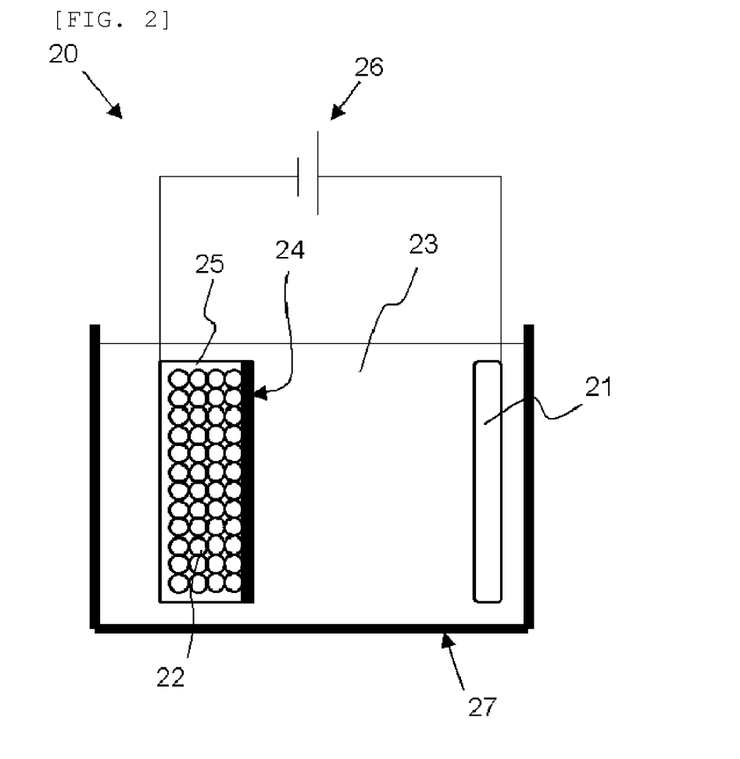
FIG. 2 is a schematic diagram showing an example of a modification apparatus usable for electrochemical Li doping in the inventive method for producing a negative electrode active material particle.

In the modification by the electrochemical doping method, Li doping can be performed using a modification apparatus 20 as shown in FIG. 2, for example. Note that the apparatus structure is not particularly limited to the structure of the modification apparatus 20. The modification apparatus 20 shown in FIG. 2 has: a bath 27 filled with an electrolytic solution 23; a counter electrode 21 disposed in the bath 27 and connected to one terminal of a power source 26; a powder storage container 25 disposed in the bath 27 and connected to the other terminal of the power source 26; and a separator 24 provided between the counter electrode 21 and the powder storage container 25. A silicon compound particle 22 is stored in the powder storage container 25. Lithium can be inserted into the silicon compound particle by dissolving lithium salt in the electrolytic solution 23 or combining a Li-containing compound with the counter electrode 21, followed by applying voltage between the powder storage container 25 and the counter electrode 21 with the power source 26 to flow current.

As a lithium source used for the electrochemical doping method, it is possible to use at least one of metal lithium, phosphate of transition metal and lithium, lithium oxide with Ni, lithium oxide with Co, lithium oxide with Mn, lithium nitrate, and lithium halide. Incidentally, the lithium salt may be in any form. That is, the lithium salt may be used as the counter electrode 21 or may be used as an electrolyte of electrolytic solution 23.

In this case, as the solvent of the electrolytic solution 23, it is possible to use dimethyl carbonate, ethylene carbonate, propylene carbonate, diethyl carbonate, dioxane, diglyme, triglyme, tetraglyme, and mixtures thereof, for example. As the electrolyte of the electrolytic solution 23, it is possible to use $LiBF_4$, $LiPF_6$, $LiClO_4$, and derivatives thereof. Particularly, $LiNO_3$, LiCl, and the like can also be used as the electrolyte that also acts as the Li source. The electrochemical doping method may also include a process of releasing Li from the silicon compound particle after inserting Li. This makes it possible to adjust Li amount to be inserted to the silicon compound particle.

After Li is electrochemically inserted, the Si valence state is changed by employing the heat stirring method. The heat stirring can be carried out with a heater equipped with a stirring mechanism configured to stir powder. Specifically, the heat stirring can be carried out with a fluidized bed heater, or a rotary kiln which is a heater equipped with a rotatable cylindrical furnace. In view of productivity, a rotary kiln is preferable.

The negative electrode active material produced as described above is mixed with other materials such as a negative electrode binder and a conductive assistant agent to form a negative-electrode mixture. Then, organic solvent, water, or the like is added thereto to form slurry. Subsequently, the slurry is applied onto the surface of a negative electrode current collector and dried to form a negative electrode active material layer. In this case, heat pressing and so on may be performed in accordance with needs. As described above, a negative electrode is successfully produced.

<Lithium Ion Secondary Battery>

Next, a lithium-ion secondary battery containing the inventive negative electrode active material will be described. Here exemplifies a lithium-ion secondary battery of a laminate film type as a concrete example.

[Configuration of Laminate Film Type Lithium-Ion Secondary Battery]

Figure 5:
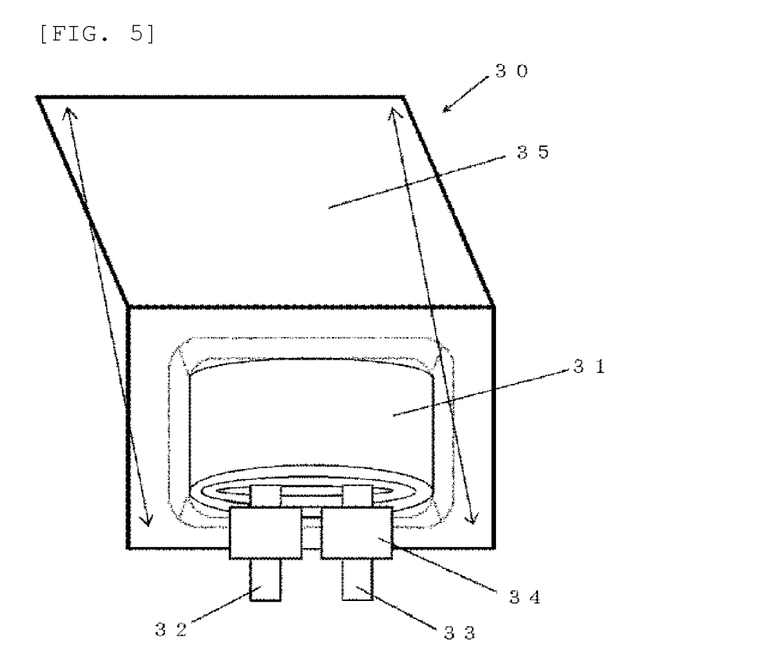
FIG. 5 is an exploded diagram showing an example of configuration (laminate film type) of a lithium secondary battery that contains the inventive negative electrode active material.

A laminate film type lithium-ion secondary battery 30 shown in FIG. 5 mainly includes a wound electrode body 31 stored in sheet-shaped outer parts 35. This wound body is formed by winding a positive electrode, a negative electrode, and a separator disposed between these electrodes. There is also a case storing a laminate having a separator disposed between a positive electrode and a negative electrode. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead and the negative-electrode lead, for example, extend from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edges of their fusion-bond layers such that each fusion-bond layer faces the wound electrode body 31. The fusion-bond layer may be, for example, a film such as a polyethylene or polypropylene film; the metallic layer may be aluminum foil, for example; the protecting layer may be nylon, for example.

The space between the outer parts 35 and the positive- and negative-electrode leads is filled with close adhesion films 34 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector like the negative electrode 10 shown in FIG. 1, for example.

The positive electrode current collector is made of, for example, a conductive material such as aluminum.

The positive electrode active material layer contains any one kind or two kinds or more of positive electrode materials capable of occluding and releasing lithium ions, and may contain a binder, a conductive assistant agent, a dispersing agent, or other materials according to design. The same detailed description as described for the negative electrode binders and negative electrode conductive assistant agent, for example, can be then given for the binder and the conductive assistant agent in this case.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this compound is expressed by, for example, $Li_xM1O_2$ or $Li_yM2PO_4$, where M1 and M2 represent at least one kind of transition metal elements, and "x" and "y" each represent a value varied depending on a charging or discharging status of a battery, which typically satisfy $0.05 \leq x \leq 1.10$ and $0.05 \leq y \leq 1.10$.

Examples of the complex oxide composed of lithium and a transition metal element include a lithium cobalt complex oxide ($Li_xCoO_2$), a lithium nickel complex oxide ($Li_xNiO_2$), and the like. Examples of the phosphate compound containing lithium and a transition metal element include a lithium iron phosphate compound ($LiFePO_4$), a lithium iron manganese phosphate compound ($LiFe_{1-u}Mn_uPO_4$ ($0<u<1$)), and the like. This is because higher battery capacity and excellent cycle characteristics are obtained using the positive electrode materials described above.

[Negative Electrode]

The negative electrode has a configuration which is similar to that of the above negative electrode 10 for a non-aqueous electrolyte secondary battery shown in FIG. 1, and, for example, has the negative electrode active material layers 12 disposed on both faces of the current collector 11. The negative electrode preferably has a negative-electrode charge capacity larger than electrical capacitance (a battery charge capacity) provided by the positive electrode active material, for this negative electrode itself can suppress the precipitation of lithium metal.

The positive electrode active material layer is formed partially on both faces of the positive electrode current collector. The negative electrode active material layer is also formed partially on both faces of the negative electrode current collector. In this case, the negative electrode active material layer provided on the negative electrode current collector, for example, has a region which does not correspond to a positive electrode active material layer to be faced. This intends to perform a stabilized battery design.

A non-facing area, that is, the above area at which the positive and negative electrode active material layers do not face one another is hardly affected by charging and discharging. The status of the negative electrode active material layer is consequently retained since its formation. This enables repeatable investigation of, for example, the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films to give laminate structure. Examples of the synthetic resin include polytetrafluoroethylene, polypropylene, polyethylene, and the like.

[Electrolytic Solution]

At least a part of the active material layers or the separator is impregnated with a liquid electrolyte (an electrolytic solution). This electrolytic solution is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, tetrahydrofuran, and the like. Among these, ethylene carbonate, propylene carbonate, dimethyl carbonate, diethyl carbonate, or ethylmethyl carbonate, or a combination thereof is preferably used because such solvent(s) enable better characteristics. In this case, superior characteristics can be obtained by combined use of a high-viscosity solvent, such as ethylene carbonate or propylene carbonate, and a low-viscosity solvent, such as dimethyl carbonate, ethylmethyl carbonate, or diethyl carbonate because the dissociation of electrolyte salt and ionic mobility are improved.

For an alloyed negative electrode, the solvent particularly preferably contains at least one of halogenated chain carbonate ester and halogenated cyclic carbonate ester. Such a solvent enables the negative electrode active material to be coated with a stable coating at charging or discharging and particularly charging. The halogenated chain carbonate ester is chain carbonate ester having halogen as a constituent element (at least one hydrogen is substituted by halogen). And the halogenated cyclic carbonate ester is cyclic carbonate ester having halogen as a constituent element (that is, at least one hydrogen is substituted by halogen).

The kind of halogen is not particularly limited, but fluorine is preferable, for fluorine enables the formation of better coating than other halogens do. A larger number of halogens are better, for a more stable coating can be obtained which reduces a decomposition reaction of an electrolytic solution.

Examples of the halogenated chain carbonate ester include fluoromethyl methyl carbonate, difluoromethyl methyl carbonate, and the like. Examples of the halogenated cyclic carbonate ester include 4-fluoro-1,3-dioxolane-2-one, 4,5-difluoro-1,3-dioxolane-2-one, and the like.

The solvent preferably contains an unsaturated carbon bond cyclic carbonate ester as an additive, for this enables the formation of a stable coating on a negative electrode at charging and discharging and the inhibition of a decomposition reaction of the electrolytic solution. Examples of the unsaturated carbon bond cyclic carbonate ester include vinylene carbonate, vinyl ethylene carbonate, and the like.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolytic solution. An example of the acid anhydride includes propane disulfonic acid anhydride.

The electrolyte salt may contain, for example, at least one light metal salt such as lithium salt. Examples of the lithium salt include lithium hexafluorophosphate ($LiPF_6$), lithium tetrafluoroborate ($LiBF_4$), and the like.

The content of the electrolyte salt in the solvent is preferably 0.5 mol/kg or more and 2.5 mol/kg or less. This content enables high ionic conductivity.

[Method of Producing Laminate Film Type Secondary Battery]

The present invention makes it possible to produce a negative electrode using a negative electrode active material produced by the inventive method for producing a negative electrode active material described above, and to produce a lithium-ion secondary battery using the produced negative electrode.

Firstly, a positive electrode is produced with the above positive electrode material. A positive electrode mixture is first created by mixing the positive electrode active material with as necessary the binder, the conductive assistant agent, and other materials, and dispersed in an organic solvent to form slurry of the positive-electrode mixture. The mixture slurry is then applied to a positive electrode current collector with a coating apparatus such as a die coater having a die head or a knife roll, and dried by hot air to obtain a positive electrode active material layer. The positive electrode active material layer is finally compressed with, for example, a roll press. In this case, heating may be performed, and the heating or the compression may be repeated multiple times.

Secondly, a negative electrode active material layer is formed on a negative electrode current collector to produce a negative electrode through the same procedure as in the above production of the negative electrode 10 for a non-aqueous electrolyte secondary battery shown in FIG. 1.

In producing the positive electrode and the negative electrode, the active material layers are formed on both faces of the positive and negative electrode current collectors. In this event, in both the electrodes, the length of these active material layers formed on the faces may differ from one another (see FIG. 1).

Then, an electrolytic solution is prepared. Subsequently, with ultrasonic welding or the like, the positive-electrode lead 32 is attached to the positive electrode current collector and the negative-electrode lead 33 is attached to the negative electrode current collector as shown in FIG. 5. Then, the positive and negative electrodes and the separator interposed therebetween are stacked or wound to produce the wound electrode body 31 and a protecting tape is stuck to the outermost circumference of the body. Next, the wound body is flattened. Subsequently, the film-shaped outer part 35 is folded in half to interpose the wound electrode body therebetween. The insulating portions of the outer parts are stuck to one another by heat sealing, thereby the wound electrode body is encapsulated with one direction being opened. The close-adhesion films are inserted between the outer parts and the positive- and negative-electrode leads. The prepared electrolytic solution is introduced from the opened side in a prescribed amount to perform the impregnation of the electrolytic solution under a vacuum. After the impregnation, the opened side is stuck by vacuum heat sealing. In this manner, the laminate film type lithium-ion secondary battery 30 is successfully produced.

EXAMPLE

Hereinafter, the present invention will be more specifically described by showing Examples of the present invention and Comparative Examples. However, the present invention is not limited to these Examples.

Example 1-1

The laminate film type lithium ion secondary battery 30 shown in FIG. 5 was prepared by the following procedure.

The procedure began with the production of a positive electrode. A positive-electrode mixture was prepared by mixing 95 mass % of $LiNi_{0.7}Co_{0.25}Al_{0.05}O$ of lithium-nickel-cobalt complex oxide (lithium-nickel-cobalt-aluminum complex oxide: NCA) as a positive electrode active material, 2.5 mass % of a positive electrode conductive assistant agent, and 2.5 mass % of a positive electrode binder (polyvinylidene fluoride: PVDF). Then, the positive-electrode mixture was dispersed in an organic solvent (N-methyl-2-pyrrolidone: NMP) to form paste slurry. The slurry was subsequently applied to both surfaces of a positive electrode current collector with a coating apparatus having a die head and dried with a drying apparatus of hot-air type. The positive electrode current collector used here had a thickness of 15 μm. The resultant was finally compressed with a roll press.

Next, a negative electrode was produced. In the beginning, a negative electrode active material was produced as follows. A mixed raw material of metallic silicon and silicon dioxide was introduced into a reaction furnace and evaporated in an atmosphere with a vacuum degree of 10 Pa to deposit the evaporated material on an adsorption plate. The deposit was sufficiently cooled and then taken out to pulverize the deposit with a ball mill. In thus obtained silicon compound particles, the value of "x" in $SiO_x$ was 1. Subsequently, the silicon compound particles were classified to adjust the particle sizes. Then, thermal decomposition CVD was performed to coat the surfaces of the silicon compound particles with carbon material.

Next, the silicon compound particles coated with the carbon material were modified by inserting lithium. In this case, first, the negative electrode active material particles were immersed in a solution (solution C) in which a lithium piece and an aromatic compound, naphthalene, were dissolved in tetrahydrofuran (hereinafter, referred to as THF). This solution C had been prepared by dissolving naphthalene in a THF solvent at a concentration of 0.2 mol/L, and then adding a lithium piece whose mass was 10 mass % of the mixture solution of THF and naphthalene. When the negative electrode active material particles were immersed, the temperature of the solution was 20° C., the immersion time was 20 hours. Then, the negative electrode active material particles were collected by filtration. By the treatment described above, lithium was inserted into the silicon compound particles. Next, the silicon compound particles having lithium inserted therein were washed. The washed silicon compound particles were heated with stirring under an Ar atmosphere. In this heat treatment, a rotary kiln was used as the heater, and the number of revolutions of the core tube of the rotary kiln was set to 1 rpm for the stirring. Moreover, the heating temperature was 720° C., and the heating time was 2 hours. Thus, the negative electrode active material particles (silicon-based negative electrode active material particles) were prepared.

Next, the negative electrode active material particles (silicon-based negative electrode active material particles) and a carbon-based active material were blended in a mass ratio of 2:8 to produce a mixed negative electrode active material. The carbon-based active material used herein was a mixture in which artificial graphite and natural graphite coated with a pitch layer were mixed in a mass ratio of 5:5. Additionally, the carbon-based active material had a median diameter of 20 μm.

Next, the produced mixed negative electrode active material, conductive assistant agent-1 (carbon nanotube, CNT), conductive assistant agent-2 (carbon fine particle with a median diameter of about 50 nm), styrene-butadiene rubber (styrene-butadiene copolymer; hereinafter, referred to as SBR), and carboxymethyl cellulose (hereinafter, referred to as CMC) were mixed in a dry mass ratio of 92.5:1:1:2.5:3. This was diluted with pure water to form negative-electrode mixture slurry. Incidentally, the foregoing SBR and CMC were negative electrode binders (negative electrode binding agents). The negative-electrode mixture slurry had a pH of 10.6.

As a negative electrode current collector, an electrolytic copper foil with a thickness of 15 μm was used. This electrolytic copper foil contained each 70 ppm by mass of carbon and sulfur. Finally, the negative-electrode mixture slurry was applied onto the negative electrode current collector, and dried at 100° C. for 1 hour in a vacuum atmosphere. The negative electrode had a deposited amount of a negative electrode active material layer per unit area at one side (also referred to as an area density) of 2.5 mg/cm$^2$ after drying.

Next, solvents, ethylene carbonate (EC) and dimethyl carbonate (DMC), were mixed, followed by dissolving electrolyte salt (lithium hexafluorophosphate: LiPF$_6$) to prepare an electrolytic solution. In this case, the solvent composition was set to EC:DMC=30:70 in a volume ratio, and the content of the electrolyte salt was set to 1 mol/kg based on the solvents. 4-fluoro-1,3-dioxolane-2-one (FEC) was added in an amount of 2% after the electrolytic solution was prepared.

Then, a secondary battery was assembled as follows. First, an aluminum lead was attached to one end of the positive electrode current collector with ultrasonic welding, and a nickel lead was welded to one end of the negative electrode current collector. Subsequently, the positive electrode, a separator, the negative electrode, and a separator were laminated in this order, and wound in the longitudinal direction to produce a wound electrode body. The end of the winding portion was fixed with a PET protecting tape. The separator used herein was a laminate film (thickness: 12 μm) in which a film mainly composed of porous polyethylene was sandwiched by films mainly composed of porous polypropylene. Thereafter, the electrode body was put between outer parts, and then peripheries excluding one side were hot melted, and thereby the electrode body was stored in the outer parts. The outer part was an aluminum laminate film in which a nylon film, an aluminum foil, and a polypropylene film were laminated. Then, the prepared electrolytic solution was introduced from the open side to perform the impregnation under a vacuum. The open side was then stuck by heat sealing.

Next, the cycle characteristics and initial charge-discharge characteristics of the secondary battery thus produced were evaluated.

The cycle characteristics were investigated in the following manner. First, two cycles of charging and discharging were performed at 0.2 C under an atmosphere of 25° C. to stabilize the battery, and the discharge capacity in the second cycle was measured. Next, charging and discharging were repeated as the third cycle and the subsequent cycles, and the discharge capacity was measured every cycle. Then, a capacity retention rate (hereinafter, also simply referred to as retention rate) in each cycle was calculated by dividing the measured discharge capacity by the discharge capacity in the second cycle. Note that, in the normal cycle, that is, in the cycles from the third cycle, the charging and discharging were performed at 0.7 C in charging and 0.5 C in discharging. In this manner, the change in the capacity retention rate in accordance with the charge-discharge cycles was observed, and the battery test was terminated when the capacity retention rate became 70% or less.

In investigating the initial charge-discharge characteristics, the first time efficiency (hereinafter, may also be referred to as initial efficiency) was calculated. The first time efficiency was calculated from the equation shown by: first time efficiency (%)=(first time discharge capacity/first time charge capacity)×100. The atmospheric temperature was the same as that in investigating the cycle characteristics.

Examples 1-2, 1-3

Secondary batteries were produced as in Example 1-1 except that the amount of lithium inserted was changed. The amount of lithium inserted in Example 1-2 was larger than that in Example 1-1. The amount of lithium inserted in Example 1-3 was much larger than those in Examples 1-1, 1-2. The amount of lithium inserted can be increased, for example, by increasing the immersion time in the solution C, or increasing the amount of lithium added into the solution C. Additionally, the valence of Si was adjusted by changing the stirring mechanism.

In this case, the negative electrode active material particles of Examples 1-1 to 1-3 had the following properties.

Figure 3:
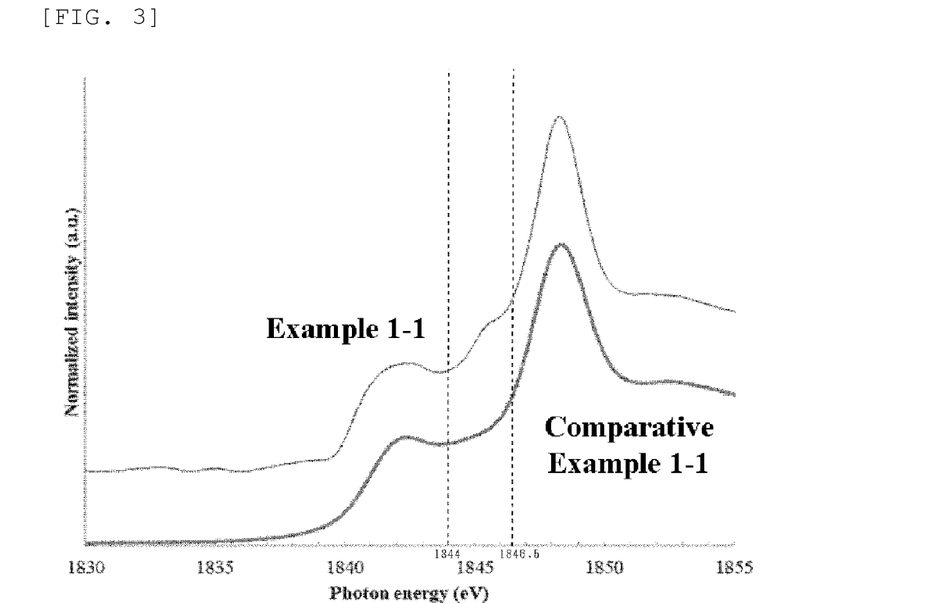
FIG. 3 shows Si k-edge spectra measured in Example 1-1 and Comparative Example 1-1.

First, in each of Examples 1-1 to 1-3, at least part of Si constituting the silicon compound particle was present in at least one state selected from oxide of $Si^{2+}$ to $Si^{3+}$ containing no Li, and compound containing Li and $Si^{2-}$ to $Si^{3+}$. This was found because a shoulder peak was observed in an energy range from 1844 eV to 1846.5 eV in a XANES region of a Si K-edge in an X-ray absorption spectrum obtained when the negative electrode active material particles before the charging were subjected to an X-ray absorption fine structure analysis. FIG. 3 shows the XANES region of the Si K-edge in the X-ray absorption spectrum obtained by the X-ray absorption fine structure analysis on the negative electrode active material particles of Example 1-1. As shown in FIG. 3, the shoulder peak was observed in the range from 1844 eV to 1846.5 eV. Note that having a peak or shoulder peak within the range was verified by the waveform separation simulation.

Figure 4:
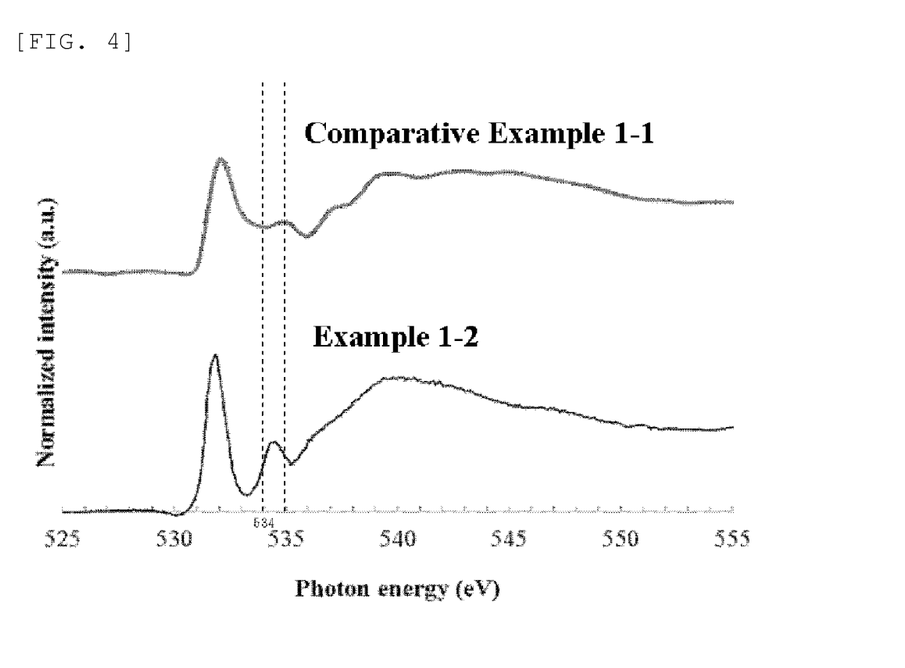
FIG. 4 shows O k-edge spectra measured in Example 1-2 and Comparative Example 1-1.

Moreover, the silicon compound particles of Examples 1-1 to 1-3 each had a peak at a position where an energy was from 534 eV or more and less than 535 eV in a XANES region of an O K-edge in an X-ray absorption spectrum. FIG. 4 shows the XANES region of the O K-edge in the X-ray absorption spectrum obtained by the X-ray absorption fine structure analysis which was performed on the negative electrode active material particles of Example 1-2 before the charging. As shown in FIG. 4, the peak was observed at a position between 534 eV or more and less than 535 eV. Note that having a peak or shoulder peak within the range was verified by the waveform separation simulation.

Figure 6:
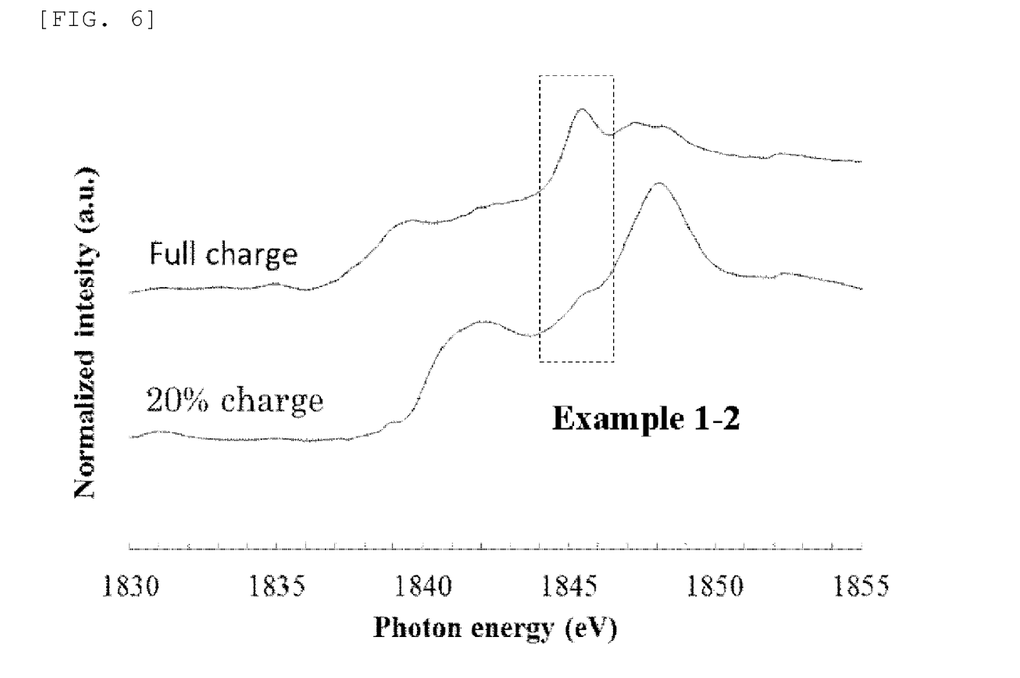
FIG. 6 shows Si k-edge spectra measured when electricity was charged in Example 1-2.

Further, in each of Examples 1-1 to 1-3, as the silicon compound particles were charged in a larger amount in the charging process, the peak or shoulder peak appearing in the energy range from 1844 eV to 1846.5 eV in the XANES region of the Si K-edge had a higher intensity. In other words, it was confirmed that $Si^{2+}$ to $Si^{3+}$ contributed to the charging. FIG. 6 shows the XANES region of the Si K-edge in X-ray absorption spectra when the silicon compound particles of Example 1-2 were fully charged ("Full Charge" in FIG. 6) and charged by 20% ("20% Charge" in FIG. 6). As can be seen from FIG. 6, the intensity of the peak or shoulder peak appearing in the range from 1844 eV to 1846.5 eV was higher in the fully charged state than in the 20% charged state.

The conditions for measuring the XANES of the Si K-edge in the XAFS were as follows.
Measurement institution: the sample was set at BL6N1 in Aichi Synchrotron Radiation Center
  accelerating energy: 1.2 GeV,
  accumulated current value: 300 mA,
  monochromatic condition: white X-ray from a bending magnet was made monochromatic with a 2-crystal spectroscope and utilized for the measurement
Focusing condition: focusing in vertical and horizontal directions with a Ni-coated bending cylindrical mirror
Upstream slit opening: 7.0 mm in a horizontal direction×3.0 mm in a vertical direction
Beam size: 2.0 mm in a horizontal direction×1.0 mm in a vertical direction
Incident angle to sample: normal incidence (incident angle of 0°)
Energy calibration: the peak position of $K_2SO_4$ at the S—K edge was calibrated to 2481.70 eV
Measurement method: all-electron yield method by measuring sample current
$I_0$ measurement method: in XANES (X-ray absorption near edge structure) measurement, Au-mesh
  : in EXAFS (extended X-ray absorption fine structure) measurement, Al-mesh
Sample environment: transferred using a transfer vessel without exposing to the atmosphere
  degree of vacuum: $5 \times 10^{-7}$ Pa The conditions for measuring the XANES of the O K-edge in the XAFS were as follows.
Measurement institution: the sample was set at BL6N1 in Aichi Synchrotron Radiation Center
  accelerating energy: 1.2 GeV,
  accumulated current value: 300 mA,
  monochromatic condition: soft X-ray from an undulator was made monochromatic with a diffraction grading spectroscope and utilized for the measurement
Focusing condition: focusing in vertical and horizontal directions with an Au-coated toroidal mirror
Slit opening: 75 µm in the entrance slit, 75 µm in the exit slit
Beam size: 0.4 mm in a horizontal direction x 0.1 mm in a vertical direction
Incident angle to sample: normal incidence (incident angle of 0°)
Energy calibration: calibrated with Au photoelectron spectrum
$I_0$ measurement method: Au-mesh
Sample environment: transferred using a transfer vessel without exposing to the atmosphere
  degree of vacuum: $3 \times 10^{-9}$ Pa In addition, the silicon compound particles in the negative electrode active material particles contained $Li_2SiO_3$ and $Li_2Si_2O_5$ in which the valence of Si was 4. Moreover, the silicon compound had a diffraction peak attributable to a Si(111) crystal face obtained from the X-ray diffraction, the half value width (2θ) of the diffraction peak was 2.593°, and the crystallite size attributable to the Si(111) crystal face was 3.29 nm. Further, the carbon material contained in the negative electrode active material particles had an average thickness of 50 nm. The negative electrode active material particles had a median diameter $D_{50}$ of 6.5 µm. Furthermore, the silicon compound of the silicon compound particles was shown by a general formula of $SiO_x$ (x=1).

Comparative Example 1-1

A secondary battery was produced under the same conditions as in Example 1-1 except that after the surfaces of the silicon compound particles were coated with the carbon material, no lithium insertion reaction was carried out, so that a material containing no lithium silicate was prepared.

In Comparative Example 1-1 in which neither Li insertion nor the subsequent heating with stirring was performed, Si constituting the silicon compound particles was not present in a state of either oxide of $Si^{2+}$ to $Si^{3+}$ containing no Li, or compound containing Li and $Si^{2-}$ to $Si^{3+}$. This was confirmed because a peak or shoulder peak did not appear in the energy range from 1844 eV to 1846.5 eV as shown in FIG. 3. Additionally, as shown in FIG. 4, no peak was observed at the position between 534 eV or more and less than 535 eV in the XANES region of the O K-edge in the X-ray absorption spectrum.

Figure 7:
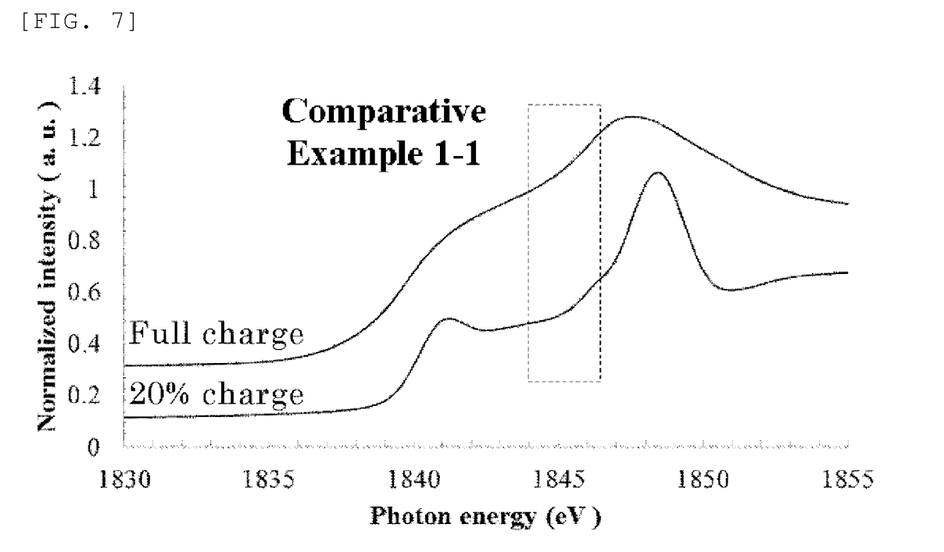
FIG. 7 shows Si k-edge spectra measured when electricity was charged in Comparative Example 1-1.

Furthermore, the negative electrode active material particles in charged states were subjected to the X-ray absorption fine structure analysis. As shown in FIG. 7, no peak or shoulder peak in the energy range from 1844 eV to 1846.5 eV appeared in the fully charged state and in the 20% charged state.

Comparative Example 1-2

A secondary battery was produced under the same conditions as in Example 1-1 except that after the Li insertion, the silicon compound particles were heated without stirring. In Comparative Example 1-2, after lithium was inserted into the negative electrode active material particles as in Example 1-1, the heating was performed at 720° C. for 2 hours. However, in this case, the powder (the Li-inserted silicon compound particles) was packed into an alumina crucible, and heated under an argon atmosphere in a stationary heating furnace to prepare the material.

Like Example 1-1, the negative electrode active material particles before the charging were subjected to the X-ray absorption fine structure analysis. No peak or shoulder peak was observed in the energy range from 1844 eV to 1846.5 eV in the obtained XANES region of the Si K-edge in the X-ray absorption spectrum.

Moreover, no peak or shoulder peak in the energy range from 1844 eV to 1846.5 eV was observed in the fully charged state and in the 20% charged state of the negative electrode active material particles when the X-ray absorption fine structure analysis was performed.

Table 1 shows the results of Examples 1-1 to 1-3, and Comparative Example 1-1, 1-2.

TABLE 1

Positive electrode: NCA, average thickness of carbon material: 50 nm, half value width of Si(111): 2.593°, crystallite size: 3.29 nm, negative electrode active material particles: $D_{50}$ = 6.5 μm, SiOx (x = 1), SiO ratio: 20 mass %

| | Presence or absence of oxide of $Si^{2+}$~$Si^{3+}$ containing no Li, and compound containing Li and $Si^{2+}$~$Si^{3+}$ | Presence or absence of peak at a position between 534 eV or more and less than 535 eV | Contribution of $Si^{2+}$~$Si^{3+}$ to charging | Presence or absence of Li silicate | Cycle number when capacity retention rate became 70% or less | Initial efficiency (%) |
|---|---|---|---|---|---|---|
| Comparative Example 1-1 | absent | absent | no | absent | 150 | 79.5 |
| Comparative Example 1-2 | absent | present | no | present | 135 | 85.0 |
| Example 1-1 | present | present | yes | present | 411 | 85.0 |
| Example 1-2 | present | present | yes | present | 471 | 86.2 |
| Example 1-3 | present | present | yes | present | 526 | 90.3 |

In Examples 1-1 to 1-3, at least part of Si constituting the silicon compound particles was present in at least one state selected from oxide of $Si^{2+}$ to $Si^{3+}$ containing no Li, and compound containing Li and $Si^{2+}$ to $Si^{3+}$, so that the cycle characteristics were improved. Moreover, since the $SiO_2$ region was modified to the Li silicate (the Li silicate in which the valence was 4) in advance before the batteries were charged, the irreversible capacities were successfully reduced, and the initial efficiencies were improved. Further, from the initial efficiencies of Examples 1-1 to 1-3, it was verified that the larger the amount of lithium inserted, the higher the initial efficiency.

On the other hand, in Comparative Example 1-1, Si constituting the silicon compound particles was not present in at least one state selected from oxide of $Si^{2+}$ to $Si^{3+}$ containing no Li, and compound containing Li and $Si^{2-}$ to $Si^{3+}$, so that the result of the cycle characteristics was inferior to those in Examples 1-1 to 1-3. Further, since no Li silicate was contained, the initial efficiency was also low.

Meanwhile, in Comparative Example 1-2, since Li silicate was contained, the initial efficiency was favorable. However, Si constituting the silicon compound particles was not present in at least one state selected from oxide of $Si^{2+}$ to $Si^{3+}$ containing no Li, and compound containing Li and $Si^{2+}$ to $Si^{3+}$, so that the result of the cycle characteristics was inferior to those in Examples 1-1 to 1-3.

Examples 2-1 to 2-3

Secondary batteries were produced under the same conditions as in Example 1-1 except for adjusting the oxygen amount in the bulk of the silicon compound. Then, the cycle characteristics and initial efficiency were evaluated. Table 2 shows the results. In this case, the oxygen amount was adjusted by changing the heating temperature or the ratio of metallic silicon and silicon dioxide in the raw material of the silicon compound.

TABLE 2

Positive electrode: NCA, average thickness of carbon material: 50 nm, half value width of Si(111): 2.593°, crystallite size: 3.29 nm, negative electrode active material particles: $D_{50}$ = 6.5 μm, SiO ratio: 20 mass %, Li silicate: present

| | x | Presence or absence of oxide of $Si^{2+}$~$Si^{3+}$ containing no Li, and compound containing Li and $Si^{2+}$~$Si^{3+}$ | Presence or absence of peak at a position between 534 eV or more and less than 535 eV | Contribution of $Si^{2+}$~$Si^{3+}$ to charging | Cycle number when capacity retention rate became 70% or less | Initial efficiency (%) |
|---|---|---|---|---|---|---|
| Example 1-1 | 1 | present | present | yes | 411 | 85.0 |
| Example 2-1 | 0.5 | present | present | yes | 210 | 86.0 |
| Example 2-2 | 1.2 | present | present | yes | 383 | 84.5 |
| Example 2-3 | 1.6 | present | present | yes | 369 | 84.0 |

With $SiO_x$ satisfying the range of $0.5 \leq x \leq 1.6$, more favorable cycle characteristics were obtained than those in Comparative Examples 1-1, 1-2 above. With x=1, particularly favorable cycle characteristics were obtained.

Examples 3-1 to 3-6

Secondary batteries were produced under the same conditions as in Example 1-1 except that the crystallinity of the silicon compound particles was changed as shown in Table 3. Then, the cycle characteristics and initial efficiency were evaluated. Note that the silicon crystallinity in the silicon compound particles was controlled by adjusting the heating conditions after the silicon compound particles were formed.

TABLE 3

Positive electrode: NCA, average thickness of carbon material: 50 nm, $Si^{2+}$ to $Si^{3+}$ compound: present, peak at a position of 534 eV or more and less than 535 eV: present, contribution of $Si^{2+}$ to $Si^{3+}$ to charging: yes, negative electrode active material particles: $D_{50}$ = 6.5 μm, SiO ratio: 20 mass %, Li silicate: present

| Table 3 | Half value width 2θ (°) | Si (111) crystallite size (nm) | Cycle number when capacity retention rate became 70% or less | Initial efficiency (%) |
|---|---|---|---|---|
| Example 3-1 | 10.123 | 1.524 | 422 | 84.8 |
| Example 1-1 | 2.593 | 3.29 | 411 | 85.0 |
| Example 3-2 | 1.845 | 4.62 | 384 | 85.2 |
| Example 3-3 | 1.755 | 4.86 | 348 | 85.3 |
| Example 3-4 | 1.218 | 7.21 | 318 | 85.3 |
| Example 3-5 | 1.025 | 8.55 | 245 | 85.3 |
| Example 3-6 | 0.796 | 10.84 | 191 | 84.8 |

High capacity retention rates were obtained particularly from the low crystallinity materials with a half value width of 1.2° or more and the crystallite size attributable to the Si(111) face being 7.5 nm or less. Among these, the best characteristics were obtained when the silicon compound was amorphous.

Examples 4-1 to 4-5

Secondary batteries were produced under the same conditions as in Example 1-1 except for changing the median diameter of the negative electrode active material particles (silicon-based negative electrode active material particles). Then, the cycle characteristics and initial efficiency were evaluated. Table 4 shows the results.

TABLE 4

Positive electrode: NCA, average thickness of carbon material: 50 nm, $Si^{2+}$ to $Si^{3+}$ compound: present, peak at a position of 534 eV or more and less than 535 eV: present, contribution of $Si^{2+}$ to $Si^{3+}$ to charging: present, SiO ratio: 20 mass %, Li silicate: present, half value width of Si (111): 2.593°, crystallite size: 3.29 nm

| Table 4 | Median diameter (μm) | Cycle number when capacity retention rate became 70% or less | Initial efficiency (%) |
|---|---|---|---|
| Example 1-1 | 6.5 | 411 | 85.0 |
| Example 4-1 | 0.5 | 371 | 79.0 |
| Example 4-2 | 1 | 401 | 82.0 |
| Example 4-3 | 10 | 405 | 86.0 |
| Example 4-4 | 15 | 402 | 85.0 |
| Example 4-5 | 20 | 348 | 78.0 |

When the median diameter of the negative electrode active material particles was 0.5 μm or more, the retention rate was improved. This is presumably because the surface area per mass of the negative electrode active material particle was not so large that the area where a side reaction occurred was small. Meanwhile, when the median diameter of the negative electrode active material particles is 15 μm or less, particles are hard to break upon charging, so that SEI (solid electrolyte interface) due to the new surface is hardly formed upon charging and discharging. Thus, the reversible Li loss is successfully suppressed. In addition, when the median diameter of the negative electrode active material particles is 15 μm or less, expansion amount of the negative electrode active material particles upon charging is not so large, making it possible to prevent physical and electrical destruction of the negative electrode active material layer due to expansion.

Examples 5-1 to 5-5

Secondary batteries were produced under the same conditions as in Example 1-1 except for changing the thickness of the carbon material. Then, the cycle characteristics were evaluated. Table 5 shows the results.

TABLE 5

Positive electrode: NCA, $Si^{2+}$ to $Si^{3+}$ compound: present, negative electrode active material particles: $D_{50}$ = 6.5 μm, peak at a position of 534 eV or more and less than 535 eV: present, contribution of $Si^{2+}$ to $Si^{3+}$ to charging: yes, SiO ratio: 20 mass %, Li silicate: present, half value width of Si (111): 2.593°, crystallite size: 3.29 nm

| Table 5 | Carbon cover layer thickness nm | Cycle number when capacity retention rate became 70% or less | Initial efficiency (%) |
|---|---|---|---|
| Example 1-1 | 50 | 411 | 85.0 |
| Example 5-1 | 0 | 375 | 79.0 |
| Example 5-2 | 5 | 388 | 83.5 |

TABLE 5-continued

Positive electrode: NCA, $Si^{2+}$ to $Si^{3+}$ compound: present,
negative electrode active material particles: $D_{50} = 6.5$
μm, peak at a position of 534 eV or more and less than 535 eV: present,
contribution of $Si^{2+}$ to $Si^{3+}$ to charging: yes, SiO
ratio: 20 mass %, Li silicate: present, half value width of Si
(111): 2.593°, crystallite size: 3.29 nm

| Table 5 | Carbon cover layer thickness nm | Cycle number when capacity retention rate became 70% or less | Initial efficiency (%) |
|---|---|---|---|
| Example 5-3 | 500 | 421 | 84.9 |
| Example 5-4 | 1000 | 418 | 85.0 |
| Example 5-5 | 5000 | 420 | 85.0 |

As can be seen from Table 5, when the carbon material coating was formed, more favorable capacity retention rate and initial efficiency were obtained than in Example in which no carbon material coating was formed. Moreover, when the carbon material had an average thickness of 5 nm or more, the electric conductivity was particularly improved, so that the capacity retention rate and initial efficiency were successfully improved. Meanwhile, when the carbon material had an average thickness of 5000 nm or less, the amount of silicon compound particles was secured sufficiently in battery design, and did not decrease the battery capacity thereby.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A negative electrode active material containing a negative electrode active material particle;
the negative electrode active material particle comprising a silicon compound particle containing a silicon compound that contains oxygen, wherein the silicon compound contains silicon and oxygen as $SiO_x$ in a ratio within $0.5 \leq x \leq 1.6$,
wherein the silicon compound particle contains a Li compound,
at least part of Si constituting the silicon compound particle is present in at least one state selected from oxide of $Si^{2+}$ to $Si^{3+}$ containing no Li, and compound containing Li and $Si^{2+}$ to $Si^{3+}$,
the silicon compound particle has a peak or shoulder peak in an energy range from 1844 eV to 1846.5 eV in a XANES region of a Si K-edge in an X-ray absorption spectrum obtained when an X-ray absorption fine structure analysis is performed,
as the silicon compound particle is charged with electricity in a larger amount in an electricity charging process, the peak or shoulder peak appearing in the energy range from 1844 eV to 1846.5 eV in the XANES region of the Si K-edge has a higher intensity,
the silicon compound particle has a peak at a position where an energy is from 534 eV or more and less than 535 eV in a XANES region of an O K-edge in an X-ray absorption spectrum obtained when an X-ray absorption fine structure analysis is performed,
the silicon compound particle contains at least one or more of $Li_2SiO_3$ and $Li_2Si_2O_5$ as the Li compound,
the silicon compound particle has a diffraction peak attributable to a Si(111) crystal face obtained from an X-ray diffraction using a Cu-Kα line,
a half value width (2θ) of the diffraction peak is 1.2° or more, and
a crystallite size corresponding to the Si(111) crystal face is 7.5 nm or less.

2. The negative electrode active material according to claim 1, wherein the negative electrode active material particle has a median diameter of 1.0 μm or more and 15 μm or less.

3. The negative electrode active material according to claim 1, wherein the negative electrode active material particle has a surface layer portion containing a carbon material.

4. The negative electrode active material according to claim 3, wherein the carbon material has an average thickness of 5 nm or more and 5000 nm or less.

5. A mixed negative electrode active material comprising:
the negative electrode active material according to claim 1; and
a carbon-based active material.

6. A method for producing the negative electrode active material particle according to claim 1, comprising the steps of:
preparing a silicon compound particle containing a silicon compound that contains oxygen;
inserting Li into the silicon compound particle; and
heating, while stirring, the Li-inserted silicon compound particle in a furnace to produce a negative electrode active material particle, wherein at least part of Si constituting the silicon compound particle is present in at least one state selected from oxide of $Si^{2+}$ to $Si^{3+}$ containing no Li, and compound containing Li and $Si^{2+}$ to $Si^{3+}$.

* * * * *